June 12, 1962  W. BREY  3,038,827
PREPARATION AND TREATMENT OF THE EDGES
OF BIAS-CUT RUBBERIZED FABRIC
Filed Aug. 14, 1957  3 Sheets-Sheet 1
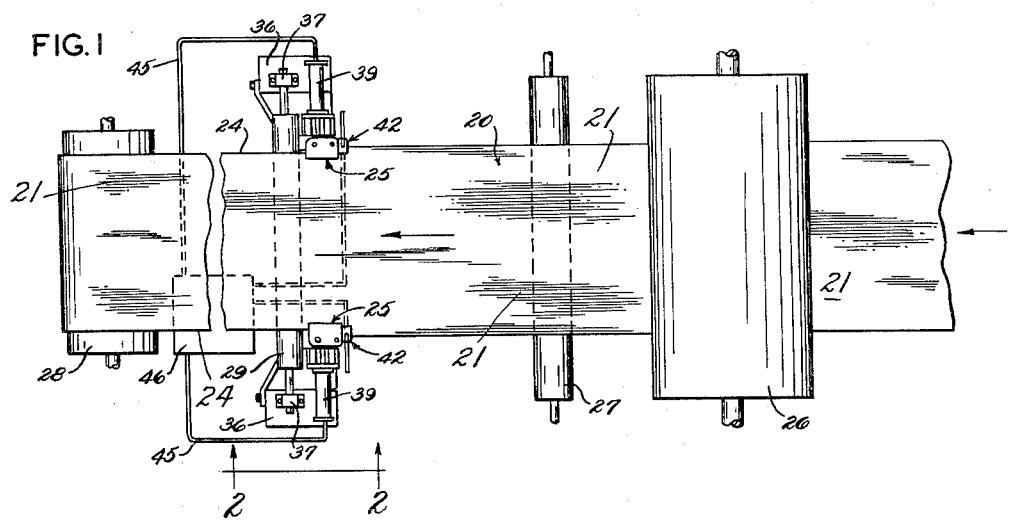
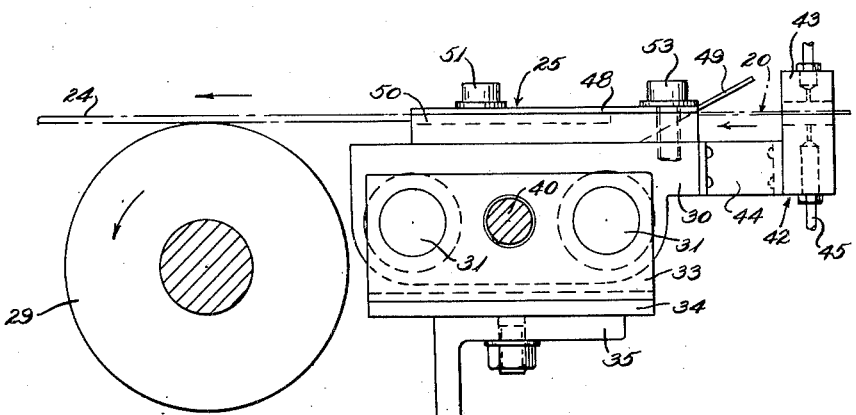
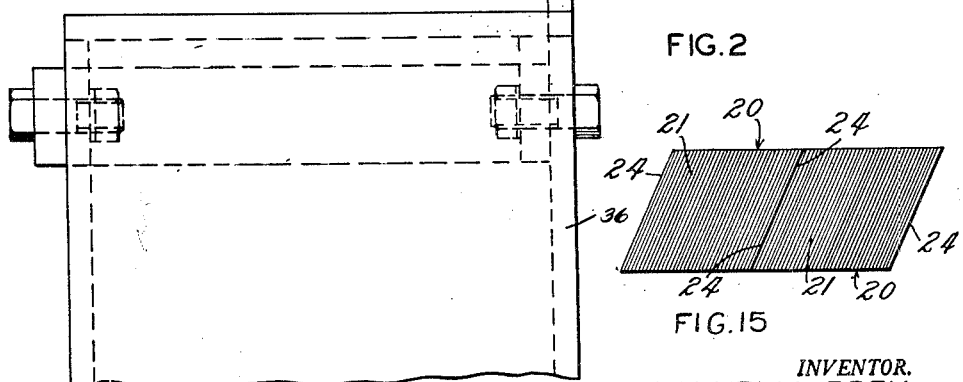
FIG. 2
FIG. 15
INVENTOR.
WILHELM BREY
BY W. A. Fraser
ATTY.

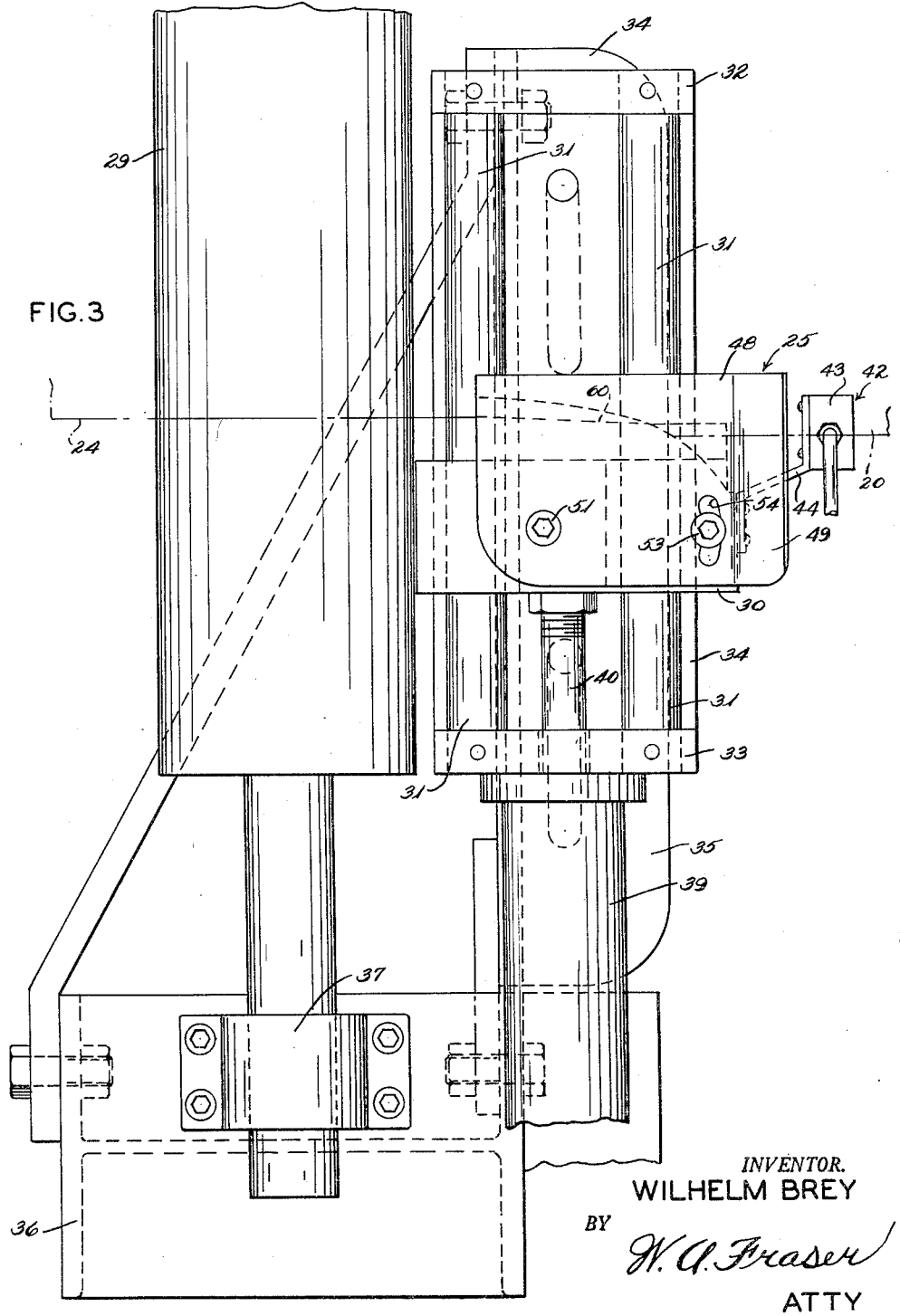

June 12, 1962  W. BREY  3,038,827
PREPARATION AND TREATMENT OF THE EDGES
OF BIAS-CUT RUBBERIZED FABRIC
Filed Aug. 14, 1957  3 Sheets-Sheet 3
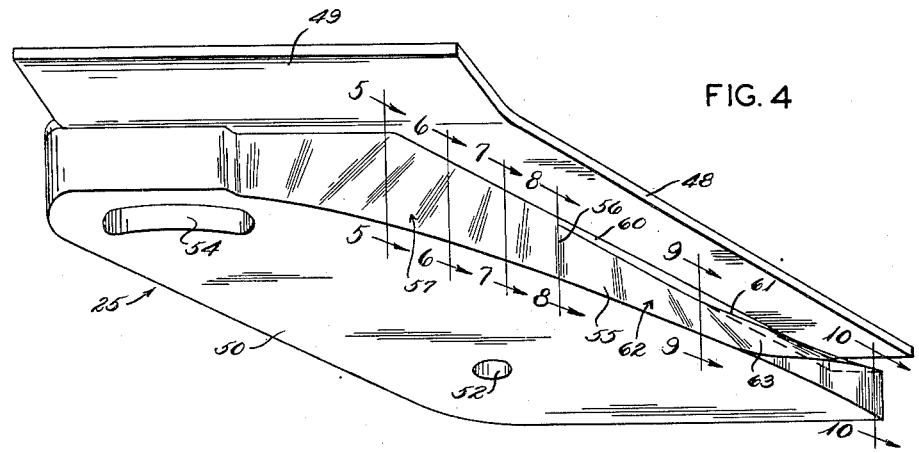
FIG. 4
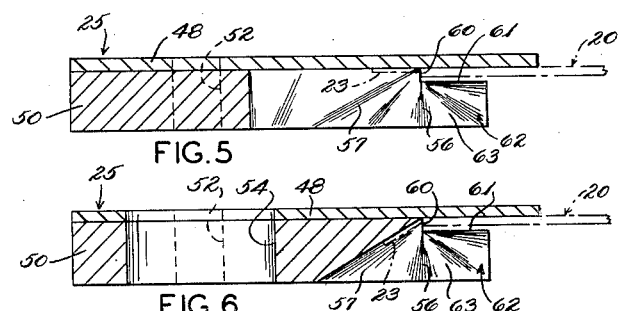
FIG. 5
FIG. 6
FIG. 7
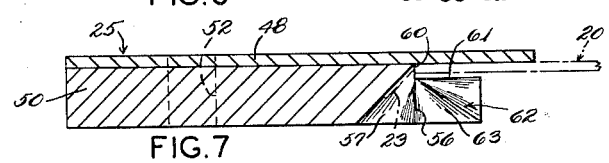
FIG. 8
FIG. 9
FIG. 10
FIG. 11
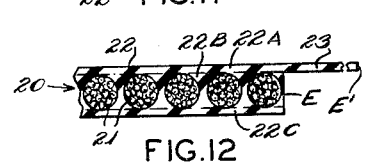
FIG. 12
FIG. 13
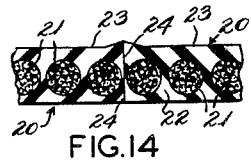
FIG. 14
INVENTOR.
WILHELM BREY
BY
W. A. Fraser
ATTY.

# United States Patent Office 3,038,827
Patented June 12, 1962

3,038,827
PREPARATION AND TREATMENT OF THE EDGES OF BIAS-CUT RUBBERIZED FABRIC
Wilhelm Brey, Cuyahoga Falls, Ohio, assignor to The Firestone Tire & Rubber Company, Akron, Ohio, a corporation of Ohio
Filed Aug. 14, 1957, Ser. No. 678,233
7 Claims. (Cl. 154—46)

The present invention relates to the preparation of fabric material having a self-adhesive insulating coating and used in the manufacture of articles such as automotive tires. More particularly, the invention relates to special preparation and treatment of the edges of rubberized fabric material, so as to provide an improved splice when short strips of fabric material which have been cut on a predetermined bias angle are joined to form a continuous web.

Until recently in this art, continuous webs of bias-cut fabric material were formed by manually overlapping the ends of successive short strips and pressing the ends together. Such overlap splicing was costly and unless performed very accurately would also possibly contribute to irregularity and imbalance of the finished tire. However, there has recently been developed apparatus which automatically performs all functions necessary to butt join or splice the trailing end of one web of bias-cut material to the leading end of a following web of material without building up the bulk of the fabric in the area of the splice. Such apparatus requires that the end or outside cords of each fabric web be covered with a sufficient amount of rubber or other coating in a self-adhesive condition.

Therefore, it is an object of the present invention to provide improvements in the preparation and treatment of fabric material having a self-adhesive insulating coating for use in construction of automotive tires and the like.

It is a further object to provide improvements in apparatus and method whereby a novel product is produced, such product being a web of fabric material having a self-adhesive insulating coating and specially prepared and shaped edges which readily permit short strips of the material when bias-cut to be butt joined or spliced to form continuous webs for use in construction of automotive tires and the like.

These and other objects of the invention, as well as the advantages thereof, will be apparent in view of the following description considered with the attached drawings.

In the drawings:

FIG. 1 is a schematic plan view of an installation of apparatus according to the invention between the last roll of a calendering machine and the fabric wind up reel;

FIG. 2 is an enlarged view in elevation taken substantially on line 2—2 of FIG. 1;

FIG. 3 is an enlarged fragmentary plan view of the apparatus elements shown in FIG. 2;

FIG. 4 is a perspective view of a novel die element for contacting and shaping the specially prepared edges of the fabric;

FIGS. 5 to 10, are sectional views in elevation taken substantially as indicated on FIG. 4;

FIG. 11 is a sectional view of the fabric edge while on the calendering machine and prior to the application of an upper insulating skim coat or layer of rubber;

FIG. 12 is a sectional view of the fabric edge after application and preparation of the upper insulating layer of coating;

FIG. 13 is a sectional view of the fabric edge after contact and shaping by the die element shown in FIG. 4;

FIG. 14 is a sectional view of an improved butt joint or splice made possible by the present invention; and FIG. 15 is a plan view on a reduced scale of the butt joint of FIG. 14 between two sections of fabric.

In the preparation of fabric material for use as tire plies, the cords of rayon, nylon or similar materials are dipped in specially formulated liquid rubber compounds and tension dried. The calendering operation then follows. Individual strips (or skim coats) of rubber are successively fed into and between at least two sets of rolls of a calendering machine where they are pressed onto both sides and in between the tire cords. The above recited steps are recognized as fairly conventional in the production of tire building material to result in an unvulcanized, rubberized tire building material with cords embedded in the unvulcanized rubber.

Referring to FIGS. 11 and 12, the rubberized fabric material is indicated generally by the numeral 20 and includes the individual cords 21 and the insulating coating 22. In the finished form of the material 20, the separately applied layers of the coating 22 become bonded homogeneously around and between the cords due to the pressure of the calender rolls. However, for purposes of understanding the present invention, the coating 22 is best described as having an upper layer 22A, a medial layer 22B and a lower layer 22C.

Referring specifically to FIG. 11, the medial layer 22B and the lower layer 22C are first applied. The outer edge E is then trued and squared by a suitable means such as a hot knife (not shown) on the calender unit so that the outer edges of layers 22B and 22C are coextensive and longitudinally aligned. Referring specifically to FIG. 12, the upper layer 22A is then applied. The outer edge E' of layer 22A which is then preferably trued and squared forms a fin 23. The fin 23 has a thickness which is preferably one-tenth to one-quarter the thickness of the composite material 20. The width of the fin, that is the distance between E and E', is preferably five to ten times the composite thickness of the material 20. In any event, the upper insulating layer 22A is applied so as to form a fin 23 of substantial width in relation to thickness.

After passage through the calender unit, the fin 23 is wrapped around or turned progressively under and integrally bonded to the medial and lower layers 22B and 22C so that the outer edge 24 of the material 20 is shaped in the manner shown in FIG. 13.

FIG. 14 is intended to show a typical improved quality butt joint or splice made possible by the specially prepared edge 24 of the material 20. The substantial thickness of adhesive coating provided by bonding of the fin 23 to the medial and lower layers 22B and 22C ensures adhesion between the abutting edges of two strips of bias cut material.

Referring to FIG. 1, it is preferred that both edges of a web of fabric material 20 be prepared according to the invention. The fin 23 of the upper insulating layer is shaped and integrally bonded to the medial and lower layers 22B and 22C by an edging die, indicated generally by the numeral 25 (see also, FIG. 4). The die elements 25 for either side of the web 20 are identical except for being opposite hand.

After passage through the calendar unit, the last roll of which is indicated at 26, the web 20 is drawn over a first idler support roll 27 by a wind up reel 28. A second idler support roll 29 is located behind the first to provide a tensioned span of the fabric material to which the edging dies are applied.

Referring to FIGS. 2 and 3, each die 25 is carried by a guide or mounting block 30. Each block 30 is movably mounted on and stabilized by a pair of parallel slide rods 31. Each pair of slide rods 31 are mounted between an inner end plate 32 and an outer end plate 33. The plates 32 and 33 are mounted one on either end of a base plate 34, carried on a flange 35. The flange 35 extends upwardly from a support stand 36. The second idler support roll 29 may be journaled in bearing blocks 37 carried on the support stand 36.

Each edging die 25 is moved transversely or laterally of the web of fabric material 20 by a conventional fluid-actuated cylinder 39 mounted on an end plate 33 and having an extensible shaft 40 connected to the slidable block 30.

The lateral movement of each edging die 25, in response to extension or retraction of the cylinder shaft 40, may be controlled by any suitable web edge position detector means located adjacent to and on either side of the tensioned span of fabric between the rolls 27 and 29 and indicated generally by the numeral 42. In the preferred form of the invention, the edge detector means 42 is as shown in U.S. Patent No. 2,794,444, issued June 4, 1957, to Frank J. Markey and assigned to Askania Regulator Company, Chicago, Illinois. However, other suitable detecting means including photo-electric cells and receivers could also be used.

The purpose of the edge detector means 42 is to position the edging die 25 in relation to the fin 23 and the edge E' of the web 20, as described in detail below. The detector head 43 is mounted on a bracket 44 extending to one side of the slidable block 30. Suitable piping 45 connects the detector head 43 with a power source 46 (see FIG. 1) to supply actuating fluid to the cylinders 39.

An edging die 25 includes a cover plate 48, which is substantially rectangular, preferably having an upwardly inclined flange 49 along the entry side. The body portion 50 of the die is extended downwardly from the cover plate 48. Each die is adjustably mounted on a slidable block 30 by a first bolt 51 extending through a close fitting bore 52 and a second bolt 53 extending through an arcuate slot 54.

As shown in FIGS. 4 to 10, the highly polished work surface 55 of the die body 50 must be specially contoured so that the tensioned fin 23 can readily be wrapped around or turned progressively under, forming the edge 24 (FIG. 13) which increases the overall integral thickness of the edge of the web.

In general, the work surface or shaping side 55 of the die body 50 may be considered as having three distinct areas or portions as follows:

(a) A front surface area extending from beneath the flange 49 to a vertical line 56 (which is approximately midway between the front and rear of the die body 50 on line 8—8 of FIG. 4) and having a gradually changing contour from the outwardly inclined surface 57 to the vertical surface 56. The work done by this front surface area is shown in FIGS. 5 to 8 whereby the fin 23 of the upper insulating layer 22A is gradually turned downwardly until it extends vertically downward at right angles to the plane of web 20 or a position of parallelism with the edge E of the medial and lower insulating layers 22B and 22C.

(b) An edge guiding portion having a true vertical surface 60 beginning approximately at line 56 and merging into a slot extending to the rear of the die body and having a horizontal bottom surface 61. The height of surface 60 is slightly greater than the maximum thickness of the fabric material 20 and the purpose thereof is shown in FIGS. 8, 9 and 10, whereby the edge E of the medial and lower insulating layers 22B and 22C is trued and stabilized so that after the fin 23 is parallel therewith, the fin will be smoothly shaped and bonded thereon forming the edge 24. It has also been found advisable to so locate the die body 50 in relation to the mounting block 30, that the plane of surface 60 extends inwardly from front to rear, approximately 3° in relation to the plane of the edge E.

(c) A rear surface area, indicated generally at 62, extending downwardly from the edge guiding surface 60 and the slot bottom surface 61 and gradually changing in inclination from the vertical line 56 to an inwardly inclined surface 63 and then gradually curving upwardly to merge with the horizontal bottom surface 61 of the edge guiding slot, so that the turned under fin 23 becomes homogeneously bonded to the medial and lower layers 22B and 22C and which thereby increases the integral thickness of the edge portion of the web.

As described above, the invention involves the construction of the die 25 and associated elements, the method in which the die 25 is employed and the novel products produced thereby. It will be further understood that the concept of the invention is also applicable to the preparation and treatment of tire building material in which the cords 21 are longitudinally aligned strands of metal wire.

What is claimed is:

1. As an article of manufacture, a web of rubberized fabric tire building material having the cords of the fabric embedded in the rubber thereof, the rubber on one edge of said web being exteriorly self-adhesive and being increased in integral thickness sufficiently to allow said edge to be joined in a butt splice with a similarly prepared edge of an adjacent web.

2. As an article of manufacture, a web of unvulcanized rubberized tire building material having a series of parallel cords embedded in the rubber of said material, the rubber on at least one edge of said web being integrally thickened to allow said edge to be joined in a butt splice with an adjacent edge of another web which has been similarly increased in thickness.

3. As an article of manufacture, a web of unvulcanized rubberized tire building material having upper, medial and lower layers homogeneously bonded together and a series of parallel cords embedded in the rubber of said material within the medial layer, the upper layer of rubber on at least one edge of said web extending beyond said cords and being wrapped around said edge of said web and bonded homogeneously to the medial and lower layers to thicken the rubber on said edge sufficiently to allow said edge to be joined in a butt splice with a similarly prepared edge of an adjacent web.

4. In a method for preparing at least one edge of a web of unvulcanized rubberized fabric tire material for joining in a butt splice with an adjacent edge of a similar web of material wherein the first said material has upper, medial and lower layers homogeneously bonded together and cords are embedded in the rubber of the medial layer, the steps of extending the rubber on the upper layer of the first said edge beyond said cords to provide a self-adhesive fin of rubber, and then progressively turning said fin downwardly and around the first said edge to integrally thicken the latter sufficiently to allow said butt splice to be formed.

5. In a method for preparing at least one edge of a web of unvulcanized rubberized fabric tire material for joining in a butt splice with an adjacent edge of a similar web of material wherein the first said material has upper, medial and lower layers homogeneously bonded together and cords are embedded in the rubber of the medial layer, the steps of longitudinally aligning the first said edge, extending the rubber on the upper layer of the first edge beyond said cords to provide a self-adhesive fin of rubber, tensioning a span of the first said web, and then progressively turning said fin downwardly and around the first said edge to integrally thicken the latter sufficiently to allow said butt splice to be formed.

6. A die for shaping the edge area of a web of fabric having a self-adhesive coating, said coating having a longitudinally aligned lower edge and an overlying thin fin extending laterally of said edge, said die including a body portion having a shaping side extending front to rear, said shaping side including: a front surface area inclined inwardly of said body at the front and gradually changing to the vertical at substantially the middle of said body; an edge guiding portion having a vertical surface extending rearwardly from substantially the middle of said body and merging into a rearwardly extending slot having a horizontal surface; and a rear surface area which is vertical at substantially the middle of said body gradually changing to the horizontal and merging with said slot.

7. A die for shaping the edge area of a web of fabric having a self-adhesive coating, said coating having a longitudinally aligned lower edge and an overlying thin fin extending laterally of said edge, said die including a cover plate having an upwardly inclined flange at the front and a body portion extending downwardly from said cover plate and having a shaping side extending front to rear, said shaping side including: a front surface area inclined inwardly of said body at the front and gradually changing to the vertical at substantially the middle of said body; an edge guiding portion having a slot extending rearwardly from substantially the middle of said body and defined by the under side of said cover plate, a vertical surface and a horizontal surface; and a rear surface area which is vertical at substantially the middle of said body gradually changing to the horizontal and merging with said slot.

References Cited in the file of this patent

UNITED STATES PATENTS

| | | |
|---|---|---|
| 652,868 | White et al. | July 3, 1900 |
| 1,242,405 | Wiggins | Oct. 9, 1917 |
| 1,714,026 | Humphries | May 21, 1929 |
| 1,714,799 | Midgley | May 28, 1929 |
| 1,726,755 | Morris | Sept. 3, 1929 |
| 1,742,777 | Midgley | Jan. 7, 1930 |
| 2,038,328 | Wells | Apr. 21, 1936 |
| 2,165,280 | Lannan | July 11, 1939 |
| 2,195,959 | Maguire | Apr. 2, 1940 |
| 2,293,751 | May | Aug. 25, 1942 |
| 2,607,308 | Bufardeci | Aug. 19, 1952 |
| 2,655,082 | Amyx et al. | Oct. 13, 1953 |
| 2,664,374 | Slayter et al. | Dec. 29, 1953 |
| 2,709,668 | Thompson | May 31, 1955 |
| 2,745,129 | Johnson | May 15, 1956 |
| 2,752,280 | Cooke et al. | June 26, 1956 |
| 2,754,883 | Secrest | July 17, 1956 |
| 2,772,718 | Magnuson | Dec. 4, 1956 |
| 2,790,482 | Riggs | Apr. 30, 1957 |